(12) United States Patent
Davidson et al.

(10) Patent No.: US 6,707,764 B2
(45) Date of Patent: Mar. 16, 2004

(54) PORTABLE TELEPHONE

(75) Inventors: Brian Davidson, Woking (GB); Mark Hutchison, Headley (GB)

(73) Assignee: Nokia Corporation, Espoo (FI)

( * ) Notice: Subject to any disclaimer, the term of this patent is extended or adjusted under 35 U.S.C. 154(b) by 222 days.

(21) Appl. No.: 10/043,334

(22) Filed: Jan. 14, 2002

(65) Prior Publication Data

US 2002/0105859 A1 Aug. 8, 2002

(30) Foreign Application Priority Data

Jan. 22, 2001 (GB) ................................ 0101573

(51) Int. Cl.$^7$ .......................... G04B 47/02; H04M 1/00; H04B 1/38; H04B 1/40
(52) U.S. Cl. ................. 368/13; 379/433.01; 379/433.1; 455/74; 455/90.3; 455/575.1
(58) Field of Search ................................ 368/3, 10, 13; 379/433.01, 433.1; 455/74, 90, 575

(56) References Cited

U.S. PATENT DOCUMENTS

| | | | | |
|---|---|---|---|---|
| 5,224,076 | A | | 6/1993 | Thorp .......................... 368/10 |
| 5,274,613 | A | | 12/1993 | Seager |
| 5,381,387 | A | | 1/1995 | Blonder et al. ................ 368/10 |
| 5,657,370 | A | * | 8/1997 | Tsugane et al. ............. 455/550 |
| 6,564,075 | B1 | * | 5/2003 | Mitamura .................... 455/575 |
| 6,567,523 | B1 | * | 5/2003 | Ghassabian ............... 379/433.1 |

* cited by examiner

*Primary Examiner*—Vit W. Miska
(74) *Attorney, Agent, or Firm*—Antonelli, Terry, Stout & Kraus, LLP

(57) ABSTRACT

A portable telephone assembly comprising first and second portions arranged to be mutually detachably interconnectable is disclosed. The second portion is arranged to be removably attachable to a user. The first portion comprises a body portion and an extendible portion movable between a relatively extended configuration and a relatively contracted configuration. The extendible portion is biased towards the relatively extended configuration, such that when the first portion is detached from the second portion, the extendible portion is urged towards the relatively extended configuration.

11 Claims, 4 Drawing Sheets

PORTABLE TELEPHONE

This invention relates to a two-part mobile telephone configured to be worn about the person, particularly in the manner of a wristwatch.

Portable telephones have become ever smaller and lighter since portable telephones first became widely available for use by the general public. Current portable telephones are very compact and lightweight, and manufacturers are keen to develop telephones which are considered personal accessories, to be carried or worn about the person, rather than separate articles which can be more easily misplaced.

Part of the inspiration for the present invention came from the realisation that people are generally accustomed to wearing a watch, and do not generally object to wearing one all day, every day. Indeed, many watches, particularly of the diving or chronograph type, can weigh considerably more than many of the more recent portable telephones. For instance, the Nokia® 8890 telephone weighs 91 g and has a volume of 70 cc, whereas a typical sports or diving watch can weigh well over 100 g. The weight of such watches is often regarded as a sign of quality.

A wrist-mounted portable telephone is disclosed in co-assigned patent GB2317300B. In this case, a telephone element 5 is arranged to be detached from a wrist band 2, allowing the user to use the detachable element in the same manner as a regular telephone.

The removable telephone part 5 has a flexible element 6 which conforms to the shape of the strap when mounted, but which adopts a straighter configuration in use (as shown by the dotted lines).

The antenna of the telephone is disposed within the flexible portion 6. This position for the antenna can cause problems. The flexible part 6 of the telephone also houses the earpiece, and due to the flexible nature of the housing, the user of the telephone may be tempted to hold the telephone by the flexible part so as to position the telephone more firmly against his ear. By doing so he may well shield the antenna with his hand, and so adversely affect its performance.

According to the present invention, there is provided a portable telephone assembly comprising first and second portions arranged to be mutually detachably interconnectable, the second portion being further arranged to be removably attachable to a user, the first portion comprising: a body portion; and an extendible portion movable between a relatively extended configuration and a relatively contracted configuration, wherein the extendible portion is biased towards the relatively extended configuration, such that when the first portion is detached from the second portion, the extendible portion is urged towards the relatively extended configuration.

For a better understanding of the present invention, and to understand how the same may be brought into effect, the invention will now be described, by way of example only, with reference to the appended drawings in which.

Figure 1:
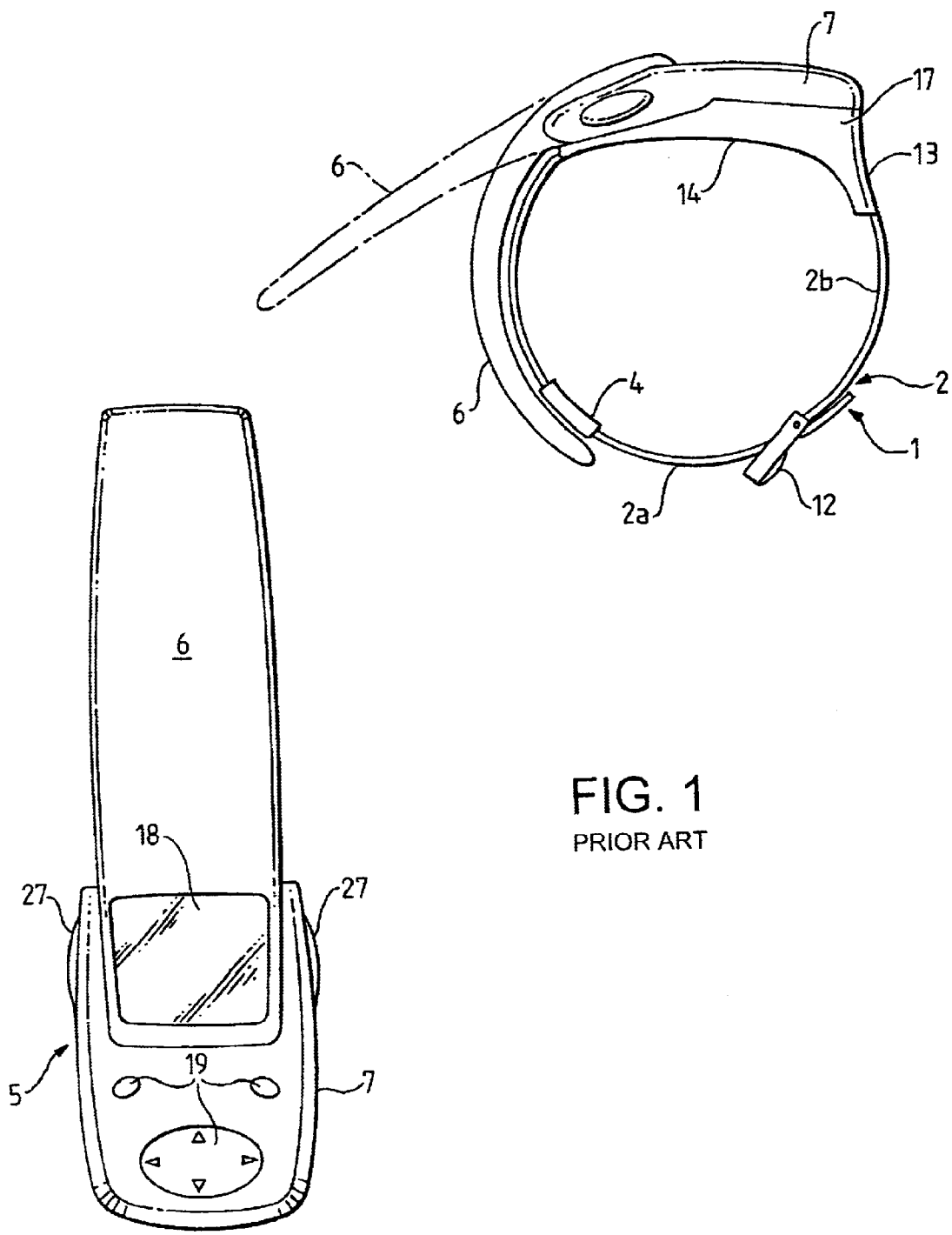
FIG. 1 shows a prior art wrist-mounted telephone.
Figure 2:
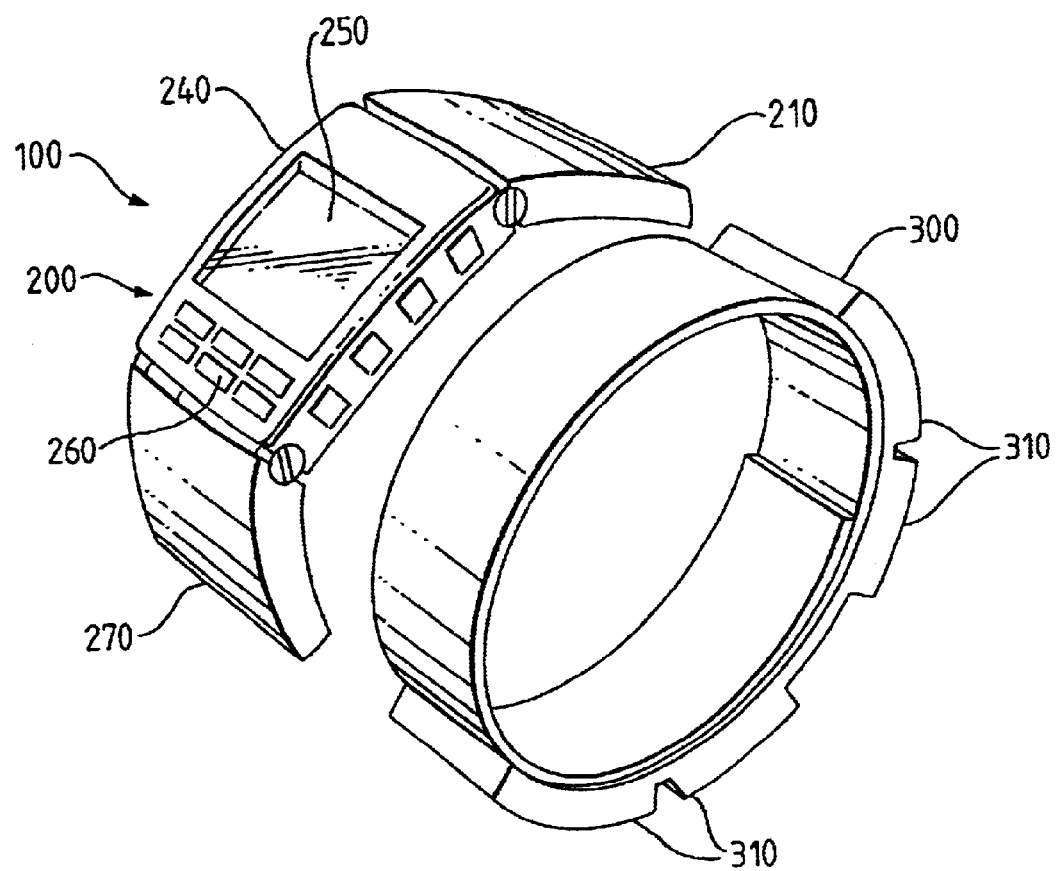
FIG. 2 shows an exploded view of a telephone apparatus according to an embodiment of the present invention.

FIG. 2 shows an exploded view of a wrist-mounted telephone apparatus 100 according to an embodiment of the invention. The telephone apparatus 100 comprises two parts: a detachable telephone part 200, and a strap or bracelet-like part 300 for attachment to a user's wrist.

The telephone part 200 is shown separate from the strap part 300 for clarity. In reality, in the mounted configuration shown, it would be located flush against the strap 300. The telephone part 200 comprises all the circuitry and elements normally associated with a portable radio telephone, as would be known by the skilled man. The telephone part comprises three major portions: an upper portion 210, a central portion 240 and a lower portion 270.

The profile of the telephone part 200 is generally curved, to provide a good fit with the bracelet part 300, which remains attached to the wrist when the telephone is in use.

The bracelet part provides a convenient means by which the telephone may be carried about the user's person. The bracelet may also provide additional functionality in the manner of an additional power supply for the telephone.

The bracelet part may be attached to the user's wrist by any conventional technique such as a buckle arrangement, or an elasticated strap.

However, there is no necessity for the telephone part to be curved as shown. Depending on the dimensions of the telephone part, it could be arranged to have a substantially flat profile. The profile chosen is matched by the attachment means of the bracelet part 300 so that reliable attachment and removal can be achieved.

A microphone element is positioned in the lower portion 270. A battery (not shown) is positioned in the lower portion also. An earpiece and antenna are positioned in the upper portion 210. The central portion 240 accommodates the bulk of the circuitry of the telephone, including a display 250, and a number of user-operable input keys 260. The keys are for controlling the operation of the telephone, and are disposed on the front surface, as well as along one or more edges of the telephone 200.

When not in use, the telephone part 200 attaches firmly to the strap part 300. In order to use the telephone, the user must operate the release mechanism to free the telephone from the strap. The release mechanism can take many forms, and its exact operation is not critical to the operation of the invention.

For instance, a release mechanism similar to that described in the aforementioned prior art document GB2317300B could be used. The mechanism therein described comprises two user-operable release latches which are situated on opposing edges of the telephone. The latches are arranged to engage with complementary parts on the bracelet and so lock the telephone to the bracelet. To remove the telephone part, the user simply squeezes the two latches, which unlocks the telephone and allows it to be removed from the bracelet. To re-attach the telephone, the user simply needs to snap the telephone back into position, and so re-engage the latches.

Alternative arrangements are possible, and will depend on the exact design chosen for the apparatus. For instance, some form of press-stud or snap-fit arrangement can be used.

When the release mechanism has been operated, and the telephone is separated from the strap, the upper portion 210 of the telephone, containing the loudspeaker and the earpiece, is urged away from the central portion 240.

The upper portion 210 is biased through the use of a spring, or similar resilient part, to adopt a position in which it is propelled away from the central portion.

Figure 3A:
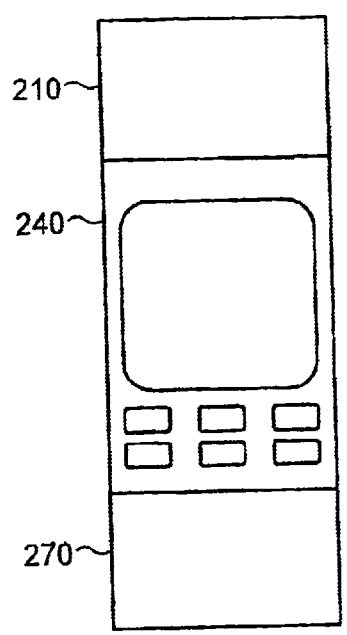
FIG. 3a shows the telephone portion of the apparatus of FIG. 2 in a relatively contracted configuration.
Figure 3B:
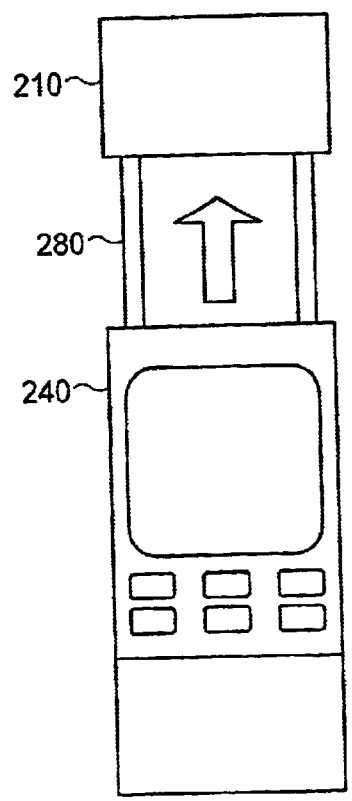
FIG. 3b shows the telephone portion of the apparatus of FIG. 2 in a relatively extended configuration.

This situation can be seen in FIGS. 3a and 3b which shows the telephone part 200 in its relatively contracted and extended positions, respectively. In normal operation, the telephone part 200 would assume the relatively contracted position when attached to the bracelet 300.

The configuration of the telephone part 200 as shown in FIG. 3b, with the upper portion in an extended position, is the natural configuration adopted by the telephone 200 when not attached to the bracelet 300. To maintain the telephone in the contracted configuration of FIG. 3a requires the application of a constraining force. The constraining force is provided by interaction with the bracelet 300 when the telephone is attached to the bracelet.

Upon removal from the strap, the internally located spring part propels the upper portion of the telephone 210 towards its relatively extended position. The upper portion 210 is supported by a pair of elongated supporting members 280. The supporting members 280 are formed as hollow tubular elements. This allows the electrical connections to the antenna and the earpiece to be routed separately through respective supporting members. This mitigates potential interference between the signals carried to and from the two separate elements.

It is, of course, possible to route both sets of connections down a common channel, if a design having a single supporting member were adopted.

The action of the upper portion 210 adopting the extended position places the telephone in a configuration ready for use: the antenna and earpiece, which reside in the upper portion 210, are now situated away from the main body of the telephone. The earpiece is thus moved further away from the microphone, and assists in achieving a better audio performance. It also feels more natural to the user for the distance between earpiece and microphone to more closely resemble the actual distance between his ear and mouth.

In the extended position, the user is encouraged to hold the telephone by the central portion 240, or possibly by the supporting members 280. This ensures that his hand is kept away from the antenna, located in upper portion 210. In this way, the signals transmitted and received by the antenna experience minimal disturbance from interaction with the user's hand.

The exact type of antenna used is not critical to the invention, but a suitable compact antenna is the plate or PIFA antenna.

The telephone can detect its attachment status by sensing the relative position of the upper portion 210. In this way, it can use the sensed attachment status as a means of controlling certain functionality of the telephone.

For instance, if the telephone is attached to the bracelet, and an incoming call is received, removal of the telephone to answer the call could automatically place the telephone in an off-hook status i.e. the call is answered merely by detaching the telephone without the need to press any keys on the telephone.

In a similar manner, the telephone can be placed in an on-hook condition by re-attaching the telephone to the bracelet.

Of course, other functions of the telephone could be controlled in a similar manner.

Figure 4A:
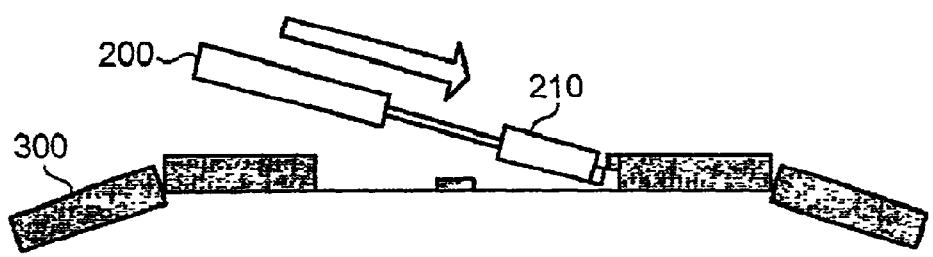
FIGS. 4a–c show the steps in the attachment of the telephone portion to the bracelet portion according to an embodiment of the invention.
Figure 4B:
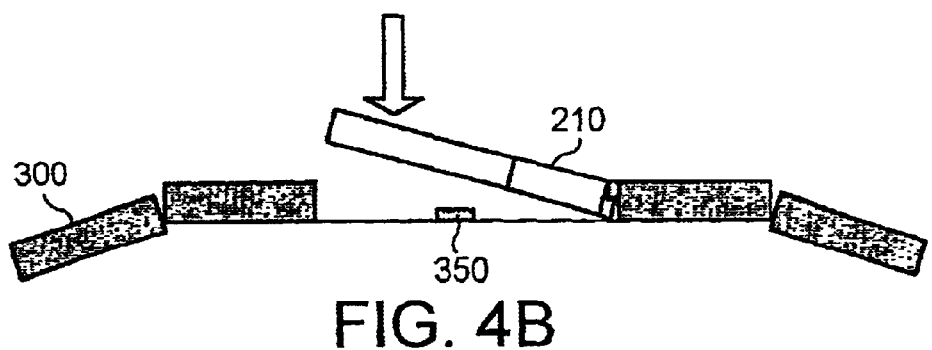
Figure 4C:
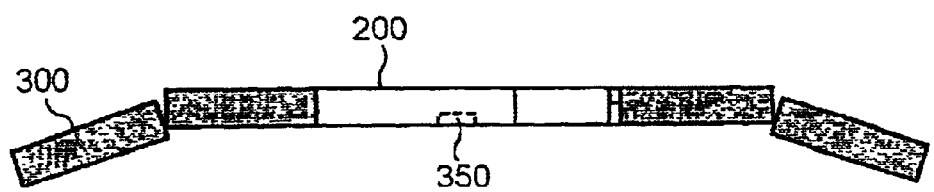

The re-attachment process is illustrated in FIGS. 4a to 4c. FIG. 4a shows the bracelet part 300 as the telephone part 200 is introduced for re-attachment. The top edge of the upper portion 210 is provided with a ridge or projection as shown. There is a corresponding complementary recess in the bracelet part 300. The upper portion 210 is inserted into the recess, and the central and lower portions (shown here as a single part for clarity) are pushed in the direction of the recess as indicated by the arrow.

The force applied by the user acts to overcome the biasing force which tends to maintain the upper portion in the relatively extended position.

Once the biasing force has been overcome, and the telephone assumes the configuration shown in FIG. 4b, the user then moves the telephone 200 in a downwards direction towards the bracelet 300. In so doing, the aforementioned attachment means, forming part of the telephone, engage with the complementary part 350 on the bracelet.

The final position is as shown in FIG. 4c. The telephone is secured in position by a combination of the effects of the projection and recess associated with the end of the upper portion 210, and the attachment system 350 associated with the central portion and the bracelet.

Again, the telephone is shown as having a generally flat profile for ease of understanding, but a curved, or other, profile could instead be adopted for the telephone.

In the light of the foregoing description, it will be clear to the skilled man that various modifications may be made within the scope of the invention.

The present invention includes any novel feature or combination of features disclosed herein either explicitly or any generalisation thereof irrespective of whether or not it relates to the claimed invention or mitigates any or all of the problems addressed.

What is claimed is:

1. A portable telephone assembly comprising first and second portions arranged to be mutually detachably interconnectable, the second portion being further arranged to be removably attachable to a user, the first portion comprising:

a body portion; and an extendible portion movable between a relatively extended configuration and a relatively contracted configuration, wherein the extendible portion is biased towards the relatively extended configuration, such that when the first portion is detached from the second portion, the extendible portion is urged towards the relatively extended configuration.

2. A telephone assembly as claimed in claim 1 wherein when the first and second parts are connected, the extendible portion adopts the relatively contracted configuration.

3. A telephone assembly as claimed in claim 1, wherein the extendible portion comprises an antenna.

4. A telephone assembly as claimed in claim 1, wherein the extendible portion comprises an earpiece.

5. A telephone assembly as claimed in claim 1 wherein the body portion comprises a display.

6. A telephone assembly as claimed in claim 1 wherein the extendible portion is supported on an elongate element.

7. A telephone assembly as claimed in claim 6 wherein the elongate element is a hollow tubular element.

8. A telephone assembly as claimed in claim 6, wherein the elongate element is disposed within the body portion when the extendible portion is in the relatively contracted configuration.

9. A telephone assembly as claimed in claim 1 wherein the relative configuration of the extendible portion controls a function of the telephone.

10. A telephone assembly as claimed in claim 9 wherein the relative configuration of the extendible portion controls the on-hook/off-hook status of the telephone.

11. A telephone assembly as claimed in claim 10 wherein removing the first portion from the second portion answers an incoming call.

\* \* \* \* \*